US012545123B2

(12) United States Patent
Huber et al.

(10) Patent No.: US 12,545,123 B2
(45) Date of Patent: Feb. 10, 2026

(54) METHOD AND SYSTEM FOR CONTROLLING ONE OR TWO ELECTICALLY-DRIVEN AXLES HAVING TWO ELECTRIC MOTORS

(71) Applicant: AVL List GmbH, Graz (AT)

(72) Inventors: Martin Huber, Oberkappel (AT); Felix Bayer, Nöstlbach (AT); Rudolf Domni, Krenglbach (AT); Peter Langthaler, Puchenau (AT); Günter Pilat, Steyr (AT); Jürgen Tochtermann, Steyr (AT); René Steinek, Neuzeug (AT)

(73) Assignee: AVL List GmbH, Graz (AT)

( * ) Notice: Subject to any disclaimer, the term of this patent is extended or adjusted under 35 U.S.C. 154(b) by 140 days.

(21) Appl. No.: 18/576,771

(22) PCT Filed: Jul. 6, 2022

(86) PCT No.: PCT/AT2022/060241
§ 371 (c)(1),
(2) Date: Jan. 5, 2024

(87) PCT Pub. No.: WO2023/279130
PCT Pub. Date: Jan. 12, 2023

(65) Prior Publication Data
US 2024/0253474 A1  Aug. 1, 2024

(30) Foreign Application Priority Data

Jul. 7, 2021  (AT) .............................. A 50560/2021
Nov. 12, 2021  (AT) .............................. A 50907/2021

(51) Int. Cl.
*B60L 15/20*  (2006.01)
*B60K 1/02*  (2006.01)
*B60L 3/00*  (2019.01)

(52) U.S. Cl.
CPC ............ *B60L 15/2036* (2013.01); *B60K 1/02* (2013.01); *B60L 3/0023* (2013.01);
(Continued)

(58) Field of Classification Search
CPC ............... B60L 15/2036; B60L 3/0023; B60L 15/2054; B60L 2220/42; B60L 2240/421;
(Continued)

(56) References Cited

U.S. PATENT DOCUMENTS 7,739,005 B1   6/2010 Tang
2008/0243322 A1* 10/2008 Nobumoto ............ B60W 10/02
701/22

(Continued)

FOREIGN PATENT DOCUMENTS

DE   102011121819   6/2013
DE   102019130331   5/2021
(Continued)

OTHER PUBLICATIONS

English translation of Tanase (JP 2017171009) (Year: 2017).*
(Continued)

*Primary Examiner* — Kyle J Kingsland

(57) ABSTRACT

The present invention relates to a method (100) for controlling one or two electrically driven axles (1a, 1b) of a vehicle with electric motors (EM1, EM2), each connected to an output (2, 2a, 2b) via a respective power transmission path (3, 4), comprising the following steps: determining (101a) values for a speed and a torque applied to at least one mechanical component (5) of the power transmission paths (3, 4) and/or the electric motors (EM1, EM2); determining a value of a damage condition of the at least one mechanical component (5) resulting from damage inputs over a predefined period of time; and controlling (107) the electrically
(Continued)

driven axles (1a, 1b) taking into account the damage condition of the at least one mechanical component (5).

15 Claims, 13 Drawing Sheets

(52) U.S. Cl.
CPC ....... *B60L 15/2054* (2013.01); *B60L 2220/42* (2013.01); *B60L 2240/421* (2013.01); *B60L 2240/423* (2013.01); *B60L 2240/425* (2013.01); *B60L 2240/486* (2013.01)

(58) Field of Classification Search
CPC ......... B60L 2240/423; B60L 2240/425; B60L 2240/486; B60L 2240/461; B60L 2240/463; B60L 2240/48; B60L 2240/525; B60L 2250/16; B60L 2260/40; B60L 50/60; B60L 15/20; B60K 1/02; B60W 30/1846; B60W 2710/083; B60W 2710/1005
See application file for complete search history.

(56) References Cited

U.S. PATENT DOCUMENTS

| 2009/0093931 | A1* | 4/2009 | Mizutani | B60K 7/0007 |
| | | | | 701/41 |
| 2010/0222953 | A1 | 9/2010 | Tang | |
| 2021/0197840 | A1 | 7/2021 | Suga | |
| 2022/0017092 | A1* | 1/2022 | Kim | B60W 10/192 |

FOREIGN PATENT DOCUMENTS

| EP | 1336527 | | 8/2003 |
| EP | 3009289 | | 4/2016 |
| JP | 2017171009 A | * | 9/2017 |
| WO | WO 2023/279130 | | 1/2023 |

OTHER PUBLICATIONS

Internationaler Recherchenbericht und Schriftlicher Bescheid [International Search Report and the Written Opinon] Dated Nov. 15, 2022 From the International Searching Authority Re. Application No. PCT/AT2022/060241 and Its Translation of Search Report Into English. (14 Pages).

* cited by examiner

METHOD AND SYSTEM FOR CONTROLLING ONE OR TWO ELECTICALLY-DRIVEN AXLES HAVING TWO ELECTRIC MOTORS

RELATED APPLICATIONS

This application is a National Phase of PCT Patent Application No. PCT/AT2022/060241 having International filing date of Jul. 6, 2022, which claims the benefit of priority of Austria Patent Application Nos. A 50907/2021 filed on Nov. 12, 2021 and A 50560/2021 filed on Jul. 7, 2021. The contents of the above applications are all incorporated by reference as if fully set forth herein in their entirety.

FIELD AND BACKGROUND OF THE INVENTION

Summary of the Invention

The invention relates to a method and system for controlling two electrically driven axles of a vehicle, each with an electric motor, wherein the first electric motor is connected to a first output via at least one first power transmission path and the second electric motor is connected to a second output via at least one second power transmission path, or for controlling an electrically driven axle with two electric motors which jointly drive an output, wherein the first electric motor is connected to the output via at least one first power transmission path and the second electric motor is connected to the output via at least one second power transmission path.

A number of powertrains and so-called e-axles which are driven by two electric motors are known from the prior art.

For example, the document DE 10 2011 121 819 A1 discloses a powertrain with two drive units for a vehicle, wherein one drive unit is in each case mechanically coupled to a partial transmission and acts thereon. The drive units are designed as electric drive units and are in each case directly mechanically coupled to a partial transmission and can be operated separately or together.

The document EP 2 450 597 A1 discloses a control device and method for an electric powertrain which is used in an electric vehicle with two motors. The aim of the control device and the method is to achieve a gear shift without interrupting power.

The control of such powertrains can be efficiency-based (see "*Shifting strategy and optimization for multi-mode E-axles*", F. Bayer, cti Symposium, Berlin 2020).

It is an object of the invention to increase, or make more predictable, the long-term reliability of electrically driven axles with two electric motors. In particular, an object of the invention is to extend the service life of important components of electrically driven axles.

This object is achieved by a method and system according to the independent claims. Advantageous embodiments are claimed in the dependent claims.

The invention relates to a method for controlling two electrically driven axles of a vehicle, each with an electric motor, wherein the first electric motor is connected to a first output via at least one first power transmission path and the second electric motor is connected to a second output via at least one second power transmission path, or for controlling an electrically driven axle with two electric motors which jointly drive an output, wherein the first electric motor is connected to the output via at least one first power transmission path and the second electric motor is connected to the output via at least one second power transmission path, comprising the following steps:

determining values for a speed and a torque applied to at least one mechanical component of the power transmission paths and/or the electric motors;

determining a value of a damage input relation to the at least one mechanical component depending on the value of the applied speed and the value of the applied torque and determining a value of a damage condition of the at least one mechanical component resulting from damage inputs over a predefined period of time; and in the case of two electrically driven axles, controlling the electrically driven axles or, in the case of one electrically driven axle, the electrically driven axle, taking into account the damage condition or the relative damage condition of the at least one mechanical component.

An electric motor is understood to be an electric machine that can basically be operated as a motor or as a generator. A mechanical component in terms of the invention is preferably a gear or a bearing.

The value of a damage input within the context of the invention is the extent to which a component is damaged by the current operation of the component. Preferably, for a mechanical component, the damage input at a given time is determined from the torque applied to the mechanical component at that time and from the rotational speed of the mechanical component. In the case of an electrical component, the temperature of the electrical component is preferably used to determine the value of the damage input.

The value of a damage condition within the context of the invention is the sum of the damage inputs accrued to date since the component was put into operation. The proportions of time during which the respective component is operated are taken into account accordingly.

If a component reaches a maximum recommended damage condition for this component, a probability of failure is reached that should not be exceeded. The component should not exceed the maximum recommended damage condition when the desired service life is reached. If the maximum recommended damage condition is considered over the desired service life and a uniform damage over time is assumed, the result is a maximum proportional damage condition for each point in time.

The value of a relative damage condition within the meaning of the invention is the ratio, in particular the quotient, of the current damage condition to the maximum proportional damage condition at that time.

According to the invention, the connection of an electric motor with an output formed by a power transmission path can also provide for a separating element, e.g. a clutch, so that the connection can also be temporarily disconnected.

The two electric motors are preferably in each case connected via a multi-speed transmission with a first output or a second output. At each of the outputs, the power and torque of each of the individual power transmission paths is input. In such an arrangement, the distribution of power or torque between the power transmission paths may be freely selected and varied, within certain limits, provided that no maximum power is required.

The invention is based on the idea of taking into account the damage condition of mechanical components when controlling electrically driven axles.

If a certain operating point of the electrically driven axles is required which is defined by output speed and output torque, there are various possibilities or degrees of freedom in terms of the operating strategy in order to realise this operating point.

On the one hand, if the power transmission paths have multi-speed transmissions, the gear can be selected for each transmission. It should however be noted that only gear combinations in which neither of the two electric motors exceeds its maximum speed are permitted. If one power transmission path is disengaged by means of a transmission, e.g. by shifting the transmission into the neutral position, the other power transmission path must be able to provide all the power, i.e. the second electric motor must be able to apply all the required torque. For each possible gear combination, the torque distribution between the two electric motors or power transmission paths is a second degree of freedom which must be defined in the operating strategy.

The sum of the torques of the two electric motors must be weighted and the respective transmission ratio must correspond to the required output torque. This means that the torque on one of the electric motors can be freely selected within a range in which the resulting torque on the other electric motor does not exceed its maximum permissible torque. Therefore, the lower the required output torque on the electrically driven axles, the greater the scope when it comes to selecting the torque on the electric motors.

By means of the invention, the damage condition that has developed up to that point can be monitored for each relevant mechanical component at the current time. The damage condition is determined from the damage inputs that have accrued to date since the component was put into service, taking into account the relevant periods of operation, i.e. by accumulating the damage inputs. The damage input at a given point in time is in turn calculated from the torque applied at that time as well as the speed. This means that the current damage condition can be determined from the damage condition at an earlier point in time by adding the damage input(s) that have accrued in the meantime. These damage inputs are calculated from the rotational speed of the component at the time in question as well as the torque applied to the mechanical component. The determined value of a damage condition is not only relevant for an adaptation of the operating strategy. Monitoring the damage condition also helps when it comes to deciding whether or not components need to be replaced. Maintenance intervals can be adjusted vehicle-specifically on the basis of the information regarding its damage condition, and workshop appointments as well as the necessary record entries such as scheduling of the vehicle with the end customer can be provided. In addition to cost savings, this also reduces the probability of powertrain failure.

A service of this type can be offered either via the ECU, a cloud service of a vehicle manufacturer or a third-party provider. These measures can be summarised under the heading of predictive maintenance.

Knowledge of the respective damage condition of the mechanical components can also be useful in fleet management. In this way, a driver or vehicle fleet operator can decide whether measures to protect components should be implemented or whether the focus should continue to be on operational efficiency. Based on the information about the damage condition of components, a fleet operator could also use the vehicle specifically on journeys that are likely to be more harmful or less harmful.

According to the method of the invention, in the case of two electrically driven axles, the electrically driven axles are controlled in such a way or, in the case of one electrically driven axle, the electrically driven axle is controlled in such a way that the damage condition or the relative damage condition of different power transmission paths in relation to each other is taken into account, in particular that the damage condition or the relative damage condition of different power transmission paths is as balanced as possible.

Preferably, the system design of the electrically driven axle defines a maximum permitted or recommended damage condition for each component and a desired service life. Preferably, the component geometry (e.g. gear width and radius for spur gears) is taken into account. Exceeding this maximum recommended damage condition leads to an increased probability of failure of the mechanical component under consideration. By means of the invention, the electrically driven axle or the electrically driven axles can now be controlled in such a way that the remaining service life, i.e. the time until the maximum recommended damage condition of the considered mechanical components is reached, and/or their probability of failure is in each case relatively balanced. On the one hand, this leads to an extension of the service life of the system as a whole, and on the other hand it preferably reduces the probability of failure and the number of workshop visits to repair or replace mechanical components.

In addition, in a further advantageous embodiment of the method, in the case of two electrically driven axles, in order to control the electrically driven axles or, in the case of one electrically driven axle, in order to control the electrically driven axle, either a transmission ratio in at least one of the two power transmission paths or a power distribution between the two electric motors is adjusted in such a way that the at least one mechanical component is not placed under stress, or only in a defined way. A uniform wear on the mechanical components can also be achieved in this way.

The damage input in relation to the at least one mechanical component is monitored. Preferably, the current damage condition is, at predefined regular intervals, compared with the maximum proportional damage condition for the entire service life at that time, i.e. the relative damage condition is determined. These intervals can be defined in a time-based manner, but also in a web-based manner.

If a damage condition or a relative damage condition of the at least one mechanical component exceeds a critical value, then according to this embodiment a choice can be made between two measures. Preferably, both measures can also be used:

The first measure corresponds to an adaptation of the strategy for the transmission in the power transmission path of the component in question. If this mechanical component is only affected in individual gears, an attempt is made to avoid such gears and thus reduce the proportion of time in which the mechanical component is active. If the mechanical component is involved in all gears of a multi-speed transmission and if this is positioned on the drive side of the shift element in the drivetrain, the highest transmission ratio should be selected. Higher transmission ratios shift the load point on the corresponding electric motor towards higher speeds and lower torques, which generally leads to lesser damage inputs. Of course, a gear change is only possible if the desired load point can also be covered in the new gear without any loss of performance, e.g. if it is not limited by a speed or torque limitation on the electric motor. In this case, the power and torque distribution between the two power transmission paths remains unchanged.

The second measure involves the adaptation of the power or torque distribution between the power transmission paths. In the power transmission path in which the at least one mechanical component is arranged, the power or torque is reduced at the expense of the other power transmission path. This means that the other power transmission path must provide a correspondingly higher power or torque. This measure reduces the damage inputs of all mechanical components in the affected power transmission path. This means that the measure is also possible if several components of the power transmission path are affected. An adaptation of the torque distribution between the two power transmission paths can for example be carried out indirectly, by reducing the maximum possible torque or maximum possible power in the respective electric motor in the affected power transmission path. The method then prioritises control of the torque distribution, with a reduced torque in the more severely damaged power transmission path. The selection of the ideal power distribution, taking into account the boundary conditions with regard to the torque distribution, can then be carried out on the basis of efficiency. By reducing the torque, the remaining service life of the two power transmission paths can be equalised.

Accordingly, in another advantageous embodiment the method includes the following steps:
verifying whether the current value for the damage condition or the relative damage condition of at least one mechanical component exceeds a first limit value; and
if the first limit value is exceeded, defining a threshold value for a torque provided by the first electric motor and/or a torque provided by the second electric motor, in particular depending on the damage input caused by the provided torque, wherein, in the case of two electrically driven axles, the electrically driven axles are controlled taking into account the threshold value for the torque or, in the case of one electrically driven axle, the electrically driven axle is controlled taking into account the threshold value for the torque.

The threshold value for the torque provided by the electric motor preferably indicates the maximum torque at which this electric motor may be operated. A low threshold value reduces the proportion of time during which the required power is covered by the more severely damaged power transmission path. This leads to a conservation of the at least one mechanical component whose damage condition exceeds the first limit value.

Compliance with the threshold value is also preferably achieved through the measures described above with regard to the at least one mechanical component.

Therefore, in a further advantageous embodiment of the method, in the case of two electrically driven axles, in order to control the electrically driven axles or, in the case of one electrically driven axle, in order to control the electrically driven axle, either a transmission ratio in at least one of the two power transmission paths is adjusted in such a way that the electric motor for which the threshold value is defined can be operated in a different operating mode at a different speed, or a power distribution between the two electric motors is adjusted in such a way that the electric motor for which the threshold value is defined has to provide or absorb less torque.

The main reason for damage to mechanical components is the torque applied to these. Therefore, by increasing the speed at the same power or by decreasing the power at the same speed, the damage input can be reduced by reducing the torque.

Which of the described measures is preferred is preferably determined taking into account the respective efficiencies.

In another advantageous embodiment of the method, the damage condition is determined as follows:

$$\int n \cdot T^p \cdot dt$$

$$\sum_i n_i T_i^p \Delta t,$$

or
where n is a speed, T a torque, $\Delta t$ is a time increment and p is a parameter which indicates an intensity of the damage input for the at least one mechanical component, wherein the parameter p is specified for each mechanical component.

The damage condition in this embodiment is therefore an accumulation of discrete-time damage inputs over a certain period of time. Preferably, the damage input for the individual components of a vehicle is recorded over the entire life cycle from the day the vehicle is put into service. In this way, it is possible to precisely predict the damage condition of the individual components.

In another advantageous embodiment, the method also includes the working steps:
determining values for a temperature of at least one electrical component;
determining a value for a damage input in relation to at least one electrical component depending on a value of the temperature and a damage condition resulting from the damage input over a predefined period of time,
wherein, in the case of two electrically driven axles, the electrically driven axles or, in the case of one electrically driven axle, the electrically driven axle, are additionally controlled taking into account the damage condition of the at least one electric component.

In the case of electrical components, e.g. electric motors or inverters, the service life is markedly influenced by the component temperature. Overheating of electrical components leads to a reduction in service life and should be avoided as far as possible. Adaptive adaptation of the control strategy reduces the likelihood of an electric motor or inverter overheating and increases component life. To do this, it is necessary to observe the temperature of the respective component, i.e. to equip electric motors and inverters with temperature sensors, for example. If the temperature of an electric motor or inverter exceeds a predetermined maximum temperature, the controller can relieve the thermal load on this component by taking the following measures:

The power required by the electrically driven axles is primarily applied via the unaffected power transmission path. The power transmission path with the component which is too hot or overheated is now only active in a supportive sense in that it provides the still-lacking power. The power distribution then shifts in favour of the cooler components. Less power is dissipated from the overheated components, which prevents further heating or leads to cooling.

If the power required by the electrically driven axles can only be applied via one power transmission path, the power transmission path in which the affected component is located can be disconnected via a transmission which may if necessary be located upstream.

After one of these two measures has been taken and the affected component has returned to an acceptable temperature range, these measures can be discontinued again.

Accordingly, in another advantageous embodiment, the method also includes the following steps:

verifying whether the current value for the damage condition or relative damage condition of an electrical component exceeds a second limit;

if the second limit value is exceeded, defining a threshold value for a power provided by the first electric motor and/or by the second electric motor, in particular depending on the damage input caused by the temperature, wherein, in the case of two electrically driven axles, the electrically driven axles or, in the case of one electrically driven axle, the electrically driven axle, are controlled taking into account the threshold value for the power provided.

By defining a threshold value for the powers provided, the damage input can be limited in terms of the temperature. As a result, an increase in the damage condition can be reduced until a value which is justified for the respective service life is reached.

In another advantageous embodiment, the electrical component is cooled depending on the value of the temperature. As a result, the damage input can be reduced.

In another advantageous embodiment, the method includes the following steps:

providing a reference damage condition for the at least one mechanical component and/or the at least one electrical component; and determining a relative damage condition based on the determined damage condition and the reference damage condition, wherein the first limit value and/or the second limit value is defined in relation to the relative damage condition.

From the design of the components of a vehicle, a permissible damage input over the service life and thus a maximum permissible damage condition at the end of this desired service life is generally known for each component. The damage inputs accrued up to a certain point in time, which together result in the damage condition, can be compared with the maximum proportional damage input up to this point, i.e. a permissible damage condition, and in this way a relative damage condition R can be determined. In relation to this relative damage condition R, measures can then be taken to adjust the damage input.

The values of the relative damage condition R can preferably be interpreted as follows:

R>1:

If the component continues to be subjected to the same stresses as before, the desired service life will probably not be achieved. A failure of the component before the end of the desired service life is possible or more likely.

R=1:

If the component continues to be subjected to the same stresses as before, the desired service life for this component is likely to be achieved.

R<1:

If the component continues to be subjected to the same stresses as before, the desired service life is likely to be exceeded with the same pattern of use. Failure of the component before the end of the desired service life is unlikely.

In another advantageous embodiment of the method, when controlling the two electric motors, in the case of two electrically driven axles, an efficiency of the electrically driven axles is also taken into account, or, in the case of one electrically driven axle, an efficiency of the electrically driven axle is also taken into account, wherein pairs of operating points of the first and second electric motors are selected in such a way that, while remaining within the threshold value for torque and/or the threshold value for power, an optimised operation in terms of efficiency is achieved in at least one of the two electric motors.

In another advantageous embodiment of the method, the threshold value or the threshold values for attenuating torque peaks and/or power peaks can be exceeded by the first and/or second electric motor.

Due to the flexible application of the threshold values, higher powers or torques can be provided without designing the components as if this power had to be called on permanently. This achieves a good compromise between the power provided, the efficiency of the system and its weight.

BRIEF DESCRIPTION OF THE SEVERAL VIEWS OF THE DRAWINGS

Further features and advantages are explained in the following description with reference to the figures.

In each case at least partially schematically.

DESCRIPTION OF SPECIFIC EMBODIMENTS OF THE INVENTION

Figure 1A:
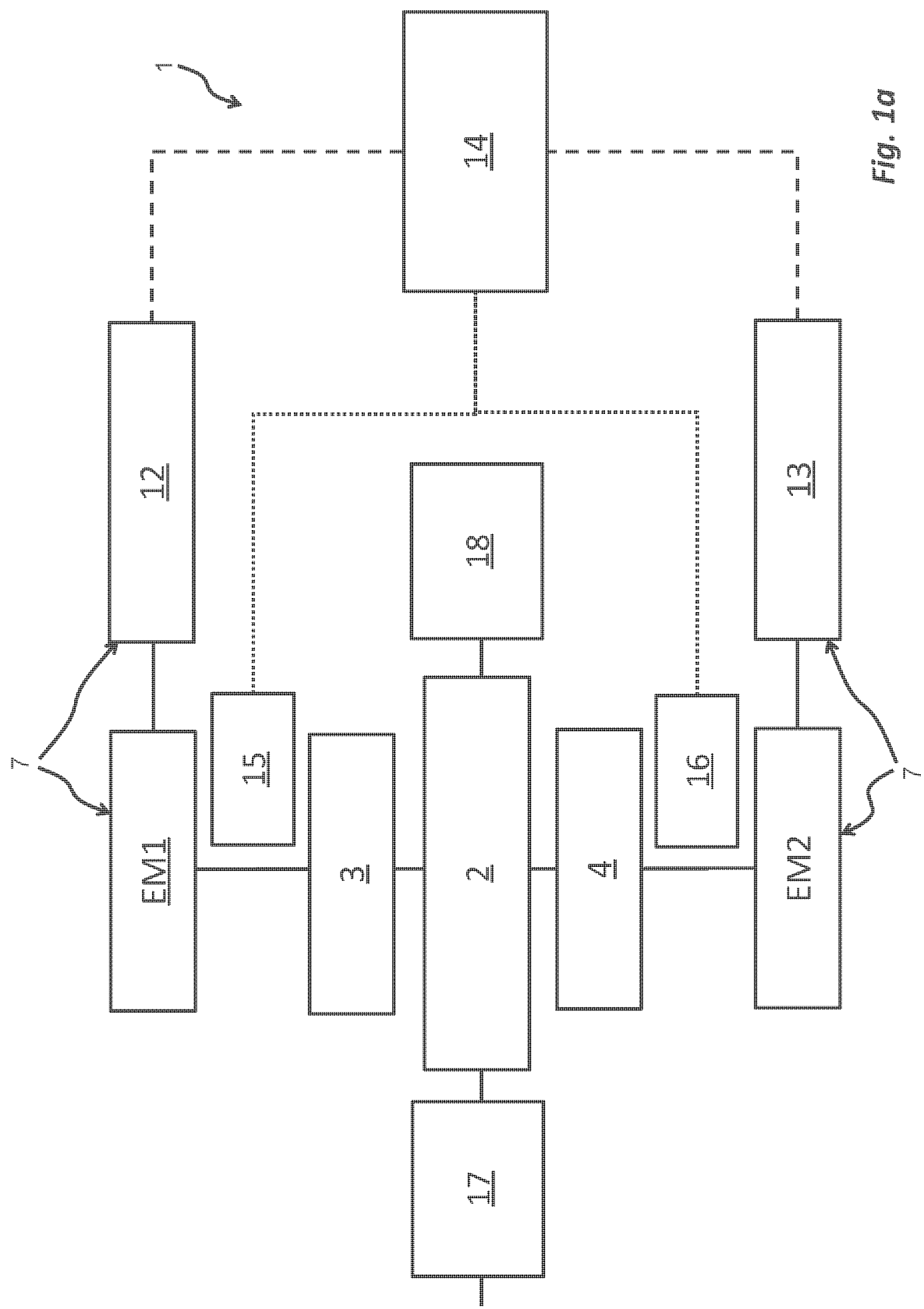
FIG. 1a: shows an exemplary embodiment of an electrically driven axle of a vehicle.

FIG. 1a shows an exemplary embodiment of an electrically driven axle 1. This is driven by two electric motors EM1 and EM2. Each of these electric motors EM1, EM2 is connected, or, if a clutch is present, connectable, to the actual axle 2 in a torque-transmitting manner via a transmission 3, 4.

The mechanical arrangement is designed in such a way that both electric motors EM1 and EM2 can drive the axle 2 simultaneously.

The driving of the axle is preferably designed in such a way that the two output torques of the transmissions 3, 4 are summed in the axle 2. For example, this can be realised by means of spur gear stages or a common differential.

The two transmissions 3, 4 can be designed as simple spur gears, i.e. single-speed transmissions, but also as multi-speed transmissions, with or without clutch.

A first power transmission path to the axle 2 from the first electric motor EM1 is formed via the first transmission 3. From the second electric motor EM2, a second power transmission path to the axle 2 is formed via the second transmission 4.

Preferably, each of the two transmissions 3, 4 has the option of disconnecting the respective power transmission path, for example via a separating clutch or by means of a neutral position.

This makes it possible to drive the axle 2 via only one of the two electric motors EM1, EM2. Each of the two electric motors EM1, EM2 is preferably supplied with electrical power via an inverter 12, 13. Preferably, the inverters 12, 13 each contain a control unit which is specified a target torque for each electric motor EM1, EM2 by the so-called E-axle control unit 14 (EACU). The currently applied torque as well as the current speed of the electric motors EM1, EM2 are provided by the E-axle control unit 14.

Preferably, the speed of the electric motors EM1 and EM2 is also in each case measured via speed sensors 15, 16 and made available to the E-axle control unit 14.

For a control strategy taking into account the mechanical damage input, the more precisely the E-axle control unit 14 knows the actual speed of the electric motors EM1, EM2 and the torque applied in the respective power transmission paths or to the respective affected components, the more advantageous this is.

The actual axle 2 in turn drives wheels 17, 18 of a vehicle.

Figure 1B:
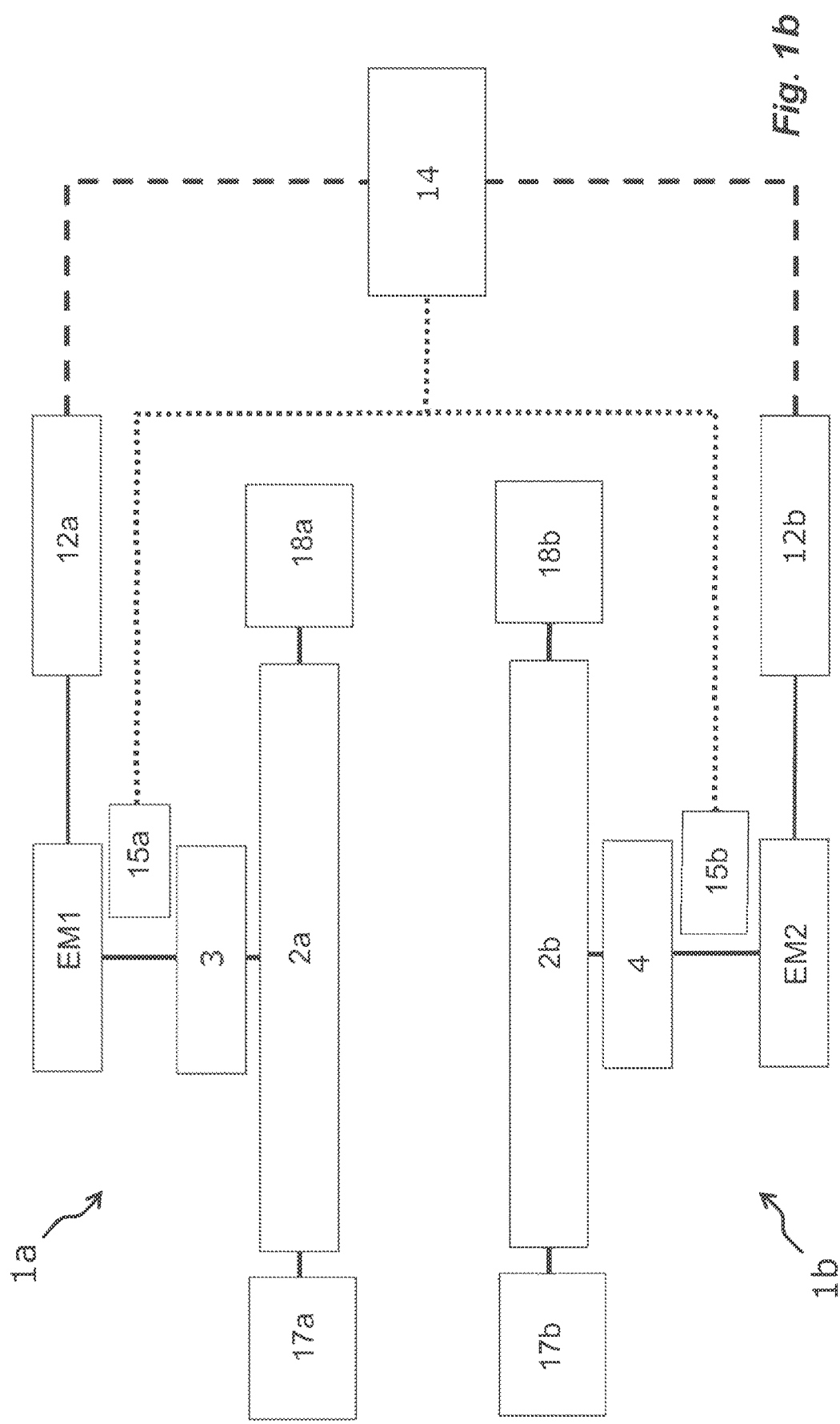
FIG. 1b: shows an exemplary embodiment of two electrically driven axles of a vehicle.

FIG. 1b shows an exemplary embodiment of two electrically driven axles 1a, 1b of a vehicle. These are driven by two electric motors, EM1 and EM2. Each of these electric motors EM1, EM2 is connected, or, if a clutch is present, connectable, to the actual axles 2a, 2b in a torque-transmitting manner via a transmission 3, 4.

The mechanical arrangement is designed in such a way that both electric motors EM1, EM2 can drive the respective connected axles 2a, 2b simultaneously.

The two transmissions 3, 4 can be designed as simple spur gears, i.e. single-speed transmissions, but also as multi-speed transmissions, with or without clutch.

A first power transmission path to the first axle 2a from the first electric motor EM1 is formed via the first transmission 3. From the second electric motor EM2, a second power transmission path to the second axle 2b is formed via the second transmission 4.

Preferably, each of the two transmissions 3, 4 has the option of disconnecting the respective power transmission path, for example via a separating clutch or by means of a neutral position.

Each of the two electric motors EM1, EM2 is preferably supplied with electrical power via an inverter 12a, 12b. Preferably, the inverters 12a, 12b each contain a control unit which is specified a target torque for each electric motor EM1, EM2 by the so-called E-axle control unit 14 (EACU). The currently applied torque as well as the current speed of the electric motors EM1, EM2 are provided by the E-axle control unit 14.

Preferably, the speed of the electric motors EM1 and EM2 is also in each case measured via speed sensors 15a, 15b and made available to the E-axle control unit 14.

For a control strategy taking into account the mechanical damage input, the more precisely the E-axle control unit 14 knows the actual speed of the electric motors EM1, EM2 and the torque applied in the respective power transmission paths or to the respective affected components, the more advantageous this is.

The actual axles 2a, 2b in turn drive wheels 17a, 17b, 18a, 18b of a vehicle.

Figure 2A:
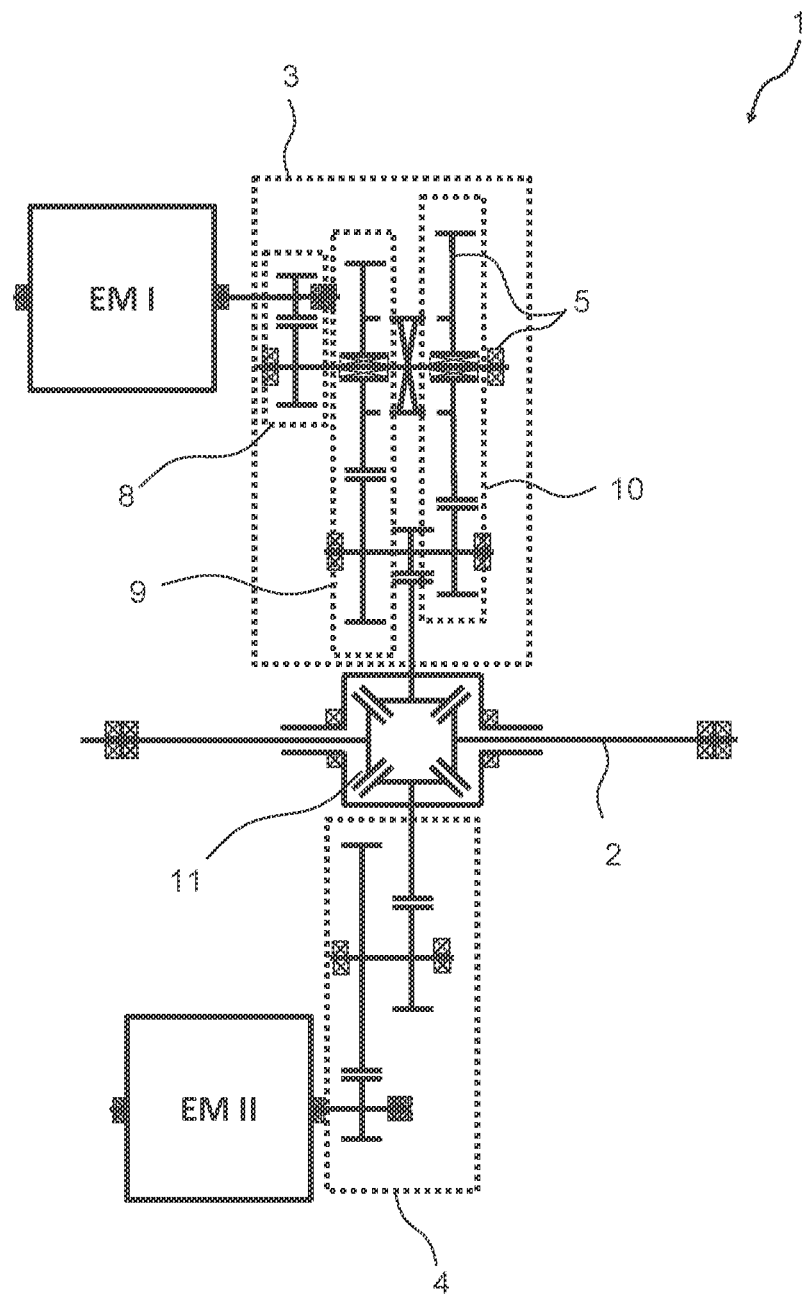
FIG. 2a: shows a detailed view of the mechanical components of a first exemplary embodiment of the one electrically driven axle.

FIG. 2a shows a detailed view of a first exemplary embodiment of an electrically driven axle 1. This detailed view shows the individual gears and bearings of the power transmission paths. These are also the components that are subject to the greatest mechanical damage during operation of the electrically driven axle 1. The first transmission 3, which substantially forms the first power transmission path, preferably has a first spur gear stage 8 and a second spur gear stage 9, 10. The second spur gear stage 9, 10 is designed to be shiftable, whereby it is possible to select between the two gears or transmission ratios as first transmission ratio 9 and second transmission ratio 10.

The second transmission 4, which substantially forms the second power transmission path, also has two spur gear stages 9, 10, but without the possibility of changing the transmission ratio. The two transmissions 3, 4 preferably drive a differential 11, which in turn drives the actual axle 2.

Figure 2B:
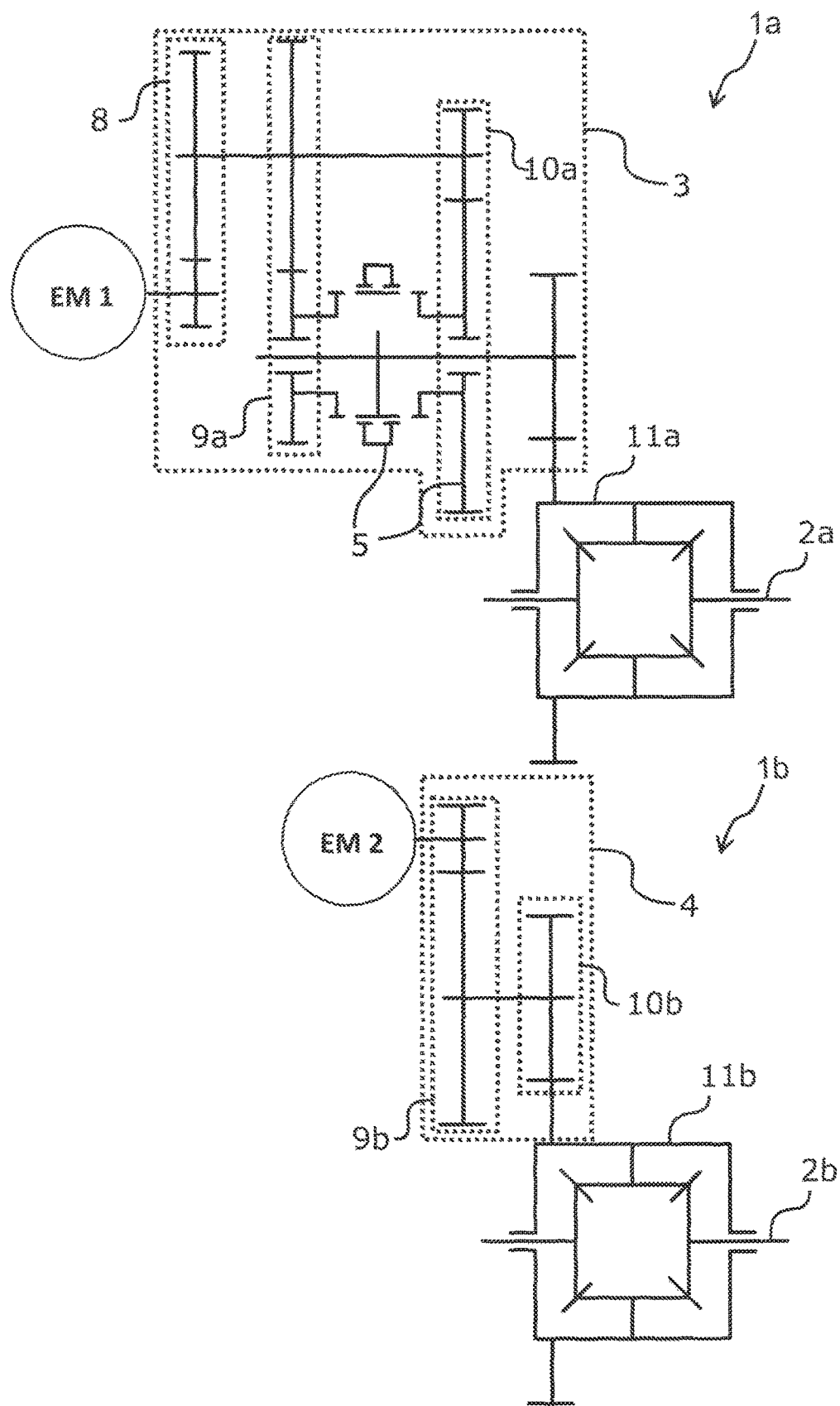
FIG. 2b: shows a detailed view of the mechanical components of a first exemplary embodiment of the two electrically driven axles.

FIG. 2b shows a detailed view of a first exemplary embodiment of a first electrically driven axle 1a and a second electrically driven axle 1b of a vehicle. This detailed view shows the individual gears and bearings of the power transmission paths. These are also the components that are subject to the greatest mechanical damage during operation of the electrically driven axles 1a, 1b. The first transmission 3, which substantially forms the first power transmission path, preferably has a first spur gear stage 8a and a second spur gear stage 9a, 10a. The second spur gear stage 9a, 10a is designed to be shiftable, whereby it is possible to select between the two gears or transmission ratios as first transmission ratio 9a and second transmission ratio 10a.

The second transmission 4, which substantially forms the second power transmission path, also has two spur gear stages 9b, 10b, but without the possibility of changing the transmission ratio. The two transmissions 3, 4 preferably in each case have a differential 11a, 11b, which in turn drives the actual axles 2a, 2b.

Figure 3A:
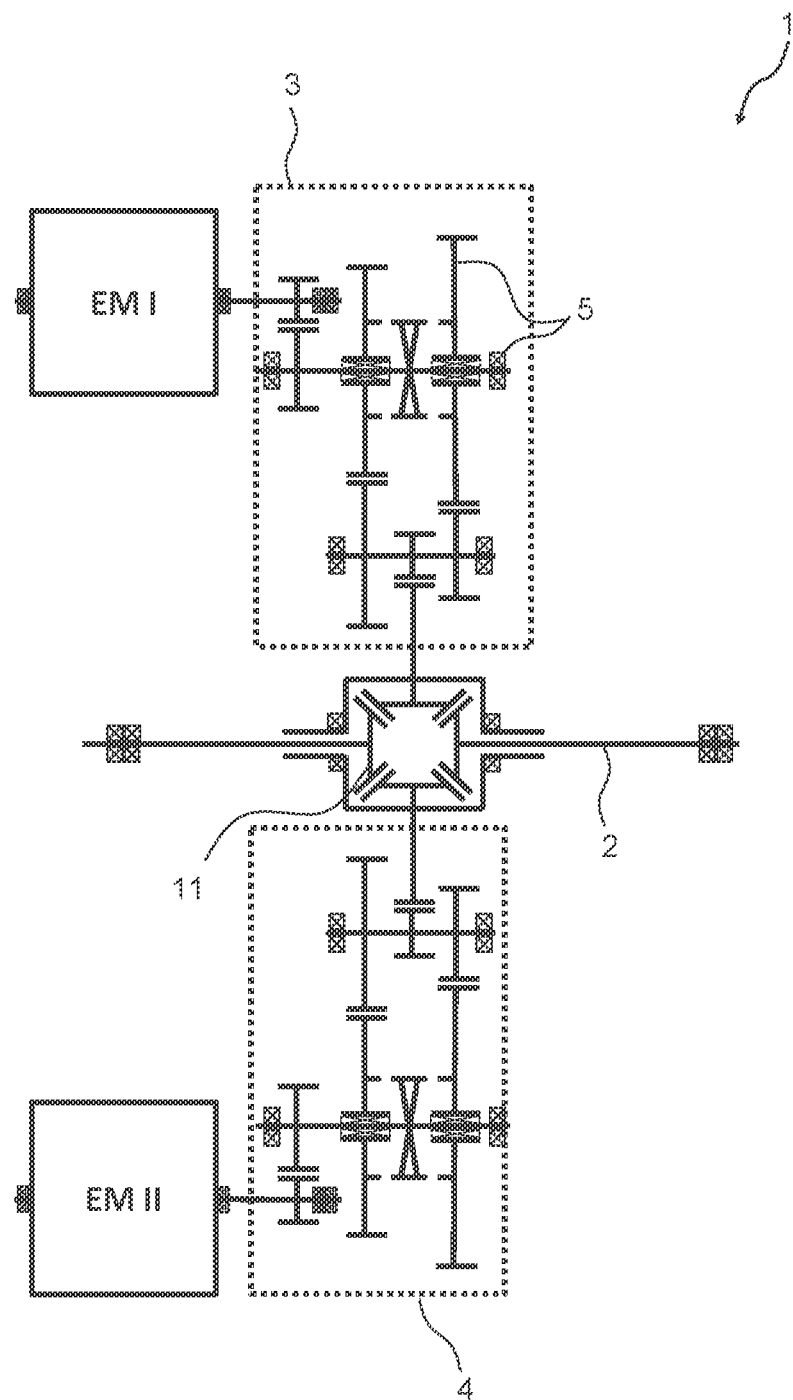
FIG. 3a: shows a detailed view of the mechanical components of a second exemplary embodiment of the electrically driven axle.

FIG. 3a shows a detailed view of the mechanical components of a second exemplary embodiment of an electrically driven axle 1. This exemplary embodiment is substantially identical to the first exemplary embodiment according to FIG. 2a. In contrast to the latter, however, the second transmission 4 is also equipped with a second transmission stage which can be shifted between two transmission ratios. In addition, a neutral position of the first transmission 3 and the second transmission 4 can also be realised by means of the clutch mechanism.

Figure 3B:
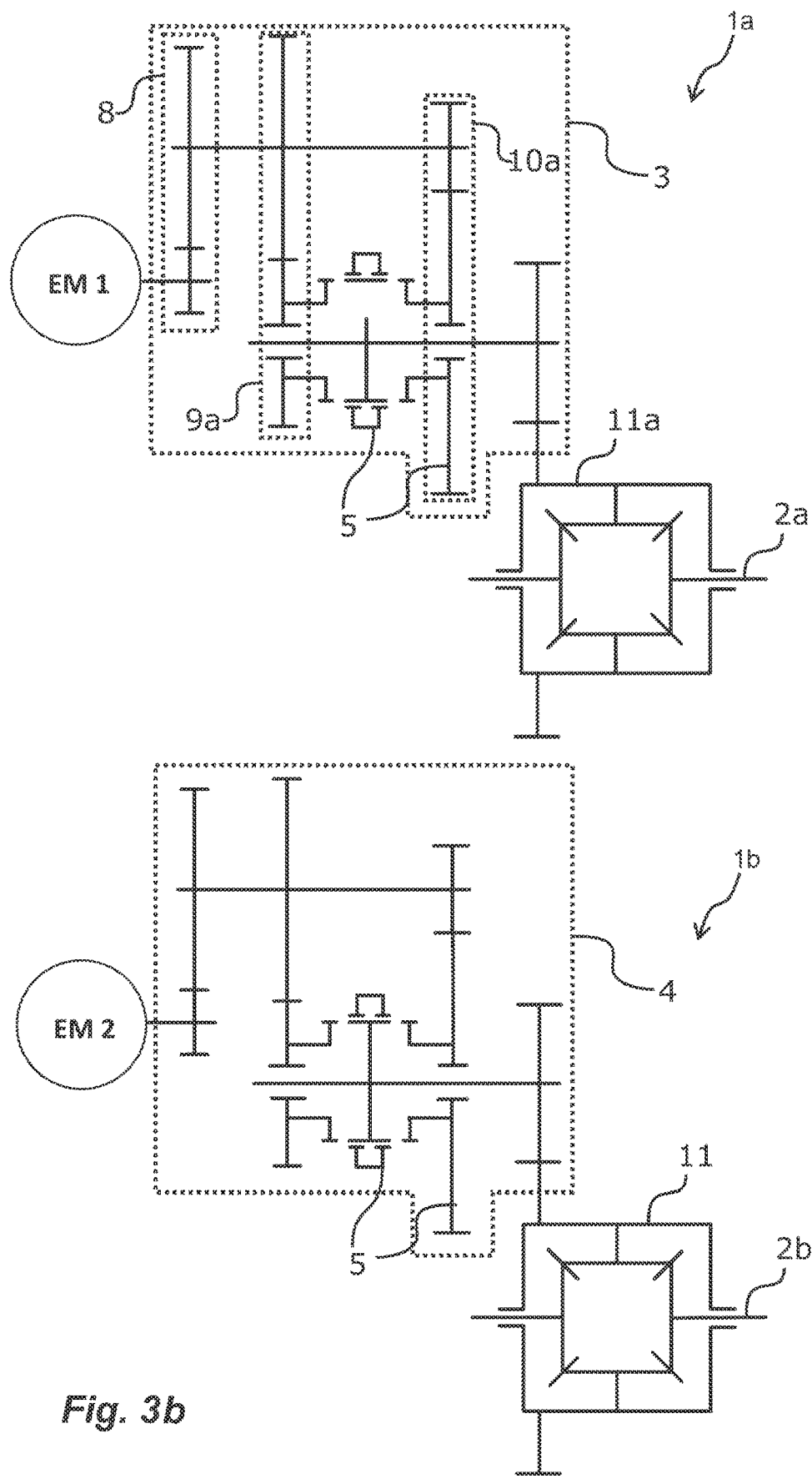
FIG. 3b: shows a detailed view of the mechanical components of a second exemplary embodiment of the two electrically driven axles.

FIG. 3b shows a detailed view of the mechanical components of a second exemplary embodiment of two electrically driven axles 1a, 1b. This exemplary embodiment is substantially identical to the first exemplary embodiment with two electrically driven axles 1a, 1b according to FIG. 2b. In contrast to the latter, however, the second transmission 4 is also equipped with a second transmission stage which can be shifted between two transmission ratios. In addition, a neutral position of the first transmission 3 and the second transmission 4 can also be realised by means of the clutch mechanism.

Figure 4:
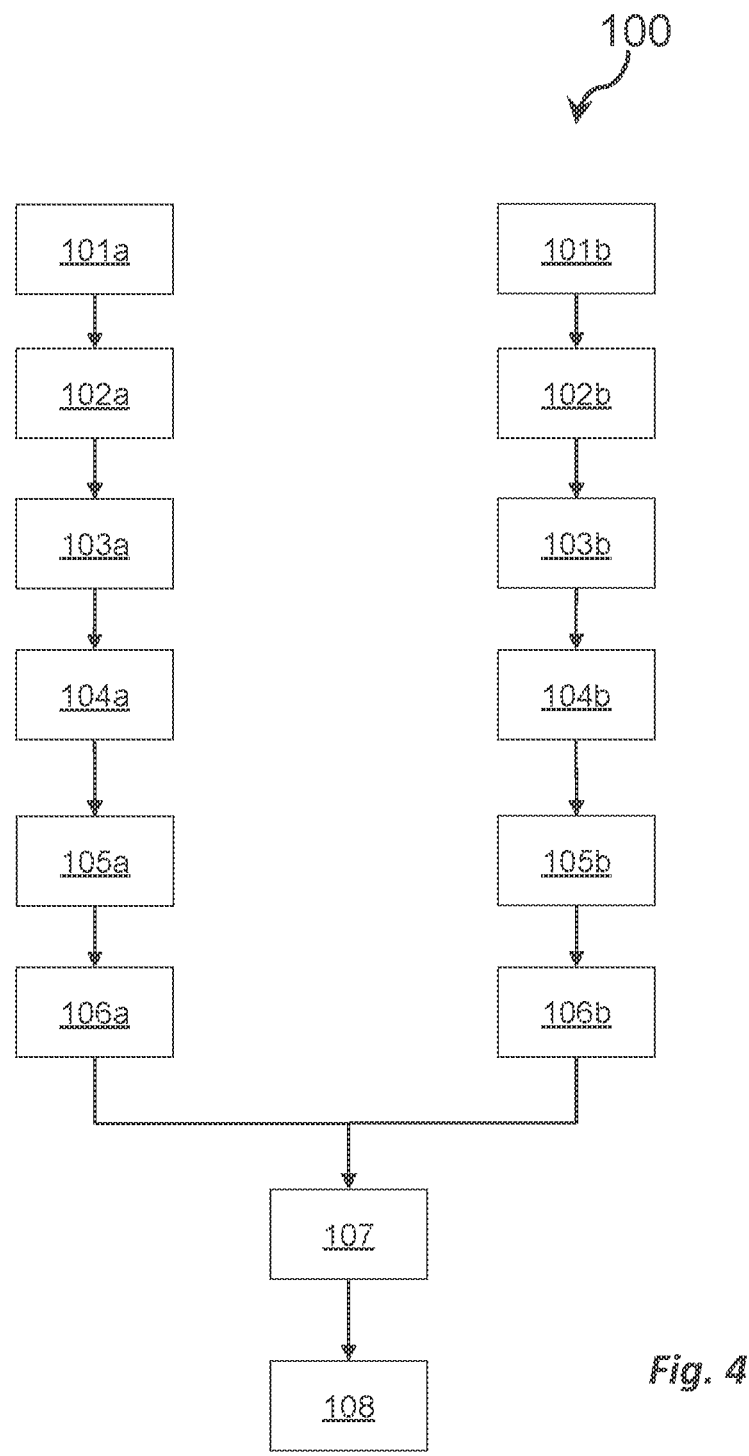
FIG. 4: shows a block diagram of an exemplary embodiment of a method for controlling an electrically driven axle.

FIG. 4 shows a block diagram of an exemplary embodiment of a method 100 for controlling an electrically driven axle 1 with two electric motors EM1, EM2 which jointly drive an output 2.

The method allows a service life which correlates with the damage to the mechanical components to be monitored and adaptively taken into account in the operating strategy in the gear selection and in the torque distribution between the two power transmission paths.

In a first step, the damage caused by mechanical action is taken into account. In addition, a damage input due to thermal stress, especially in the case of electrical components, can also be taken into account in the operating strategy.

In a first step 101a), values of a speed and a torque which are applied to at least one mechanical component 5 of the transmission paths of the power transmission paths and the electric motors are therefore determined. In particular, the values are measured directly or indirectly by means of sensors. Such mechanical components 5 to which the torques are applied are in particular the bearings and the gears.

In a second step 102a), a value of a damage input in relation to the at least one mechanical component 5 is determined depending on the value of the applied speed and the value of the applied torque, and a value of a damage condition of the at least one mechanical component 5 resulting from damage inputs over a predefined period of time is determined.

Preferably, in a third step 103a), a maximum proportional damage condition Dmax(t) is provided for the at least one mechanical component and/or the at least one electrical component.

In a fourth step 104a), a relative damage condition Rj(t) is determined on the basis of the determined damage condition Dj(t) and the maximum proportional damage condition Dmax(t), whereby the first limit value and/or the second limit value is/are defined in relation to the relative damage condition.

Furthermore, in a fifth step 105a), it is preferably checked whether the value of the damage condition exceeds a first limit value.

In a sixth step 106a), if the first limit value is exceeded, a threshold value for a torque provided by the first electric motor EM1 and/or by the second electric motor EM2 is preferably defined, in particular depending on the damage input and/or the damage condition caused by the provided torque, whereby the electrically driven axle is controlled taking into account the threshold value for the provided power.

Finally, in a seventh step 107, the electrically driven axle 1 is controlled taking into account the damage condition of the at least one mechanical component 5.

Preferably, the electrically driven axle 1 is controlled in such a way that the relative damage condition and/or the current damage input of different power transmission paths 3, 4 in relation to each other is taken into account. Furthermore, the axle is preferably controlled in such a way that the relative damage condition of different power transmission paths is balanced as much as possible.

There are essentially two alternatives here for controlling the electrically driven axle 1: either a transmission ratio in at least one of the two power transmission paths 3, 4 is adjusted in such a way that the at least one mechanical component 5 is not placed under stress, or only in a defined way, or a power distribution between the two electric motors EM1 and EM2 is adjusted in such a way that the mechanical component is likewise not placed under stress, or only in a defined way.

Also preferably, in order to control the electrically driven axle, either a transmission ratio in at least one of the two power transmission paths is adjusted in such a way that the electric motor EM1, EM2 for which the threshold value is defined can be operated at a different operating point at a different, in particular higher speed, or a power distribution between the two electric motors is adjusted in such a way that that the electric motor EM1, EM2 for which the threshold value is defined has to provide or absorb less torque.

In the second step 102a), the damage condition is preferably determined by the following formulas:

$$\int n \cdot T^p \cdot dt$$

or $$\sum_i n_i T_i^p \Delta t$$

where n is a speed, T is a torque, $\Delta t$ is a time increment and p is a parameter that specifies an intensity of the damage input for the at least one mechanical component 5. The parameter p must be specified for each mechanical component 5.

As shown in FIG. 4 (right-hand branch), the method 100 for controlling the electric axle can also be carried out in parallel for electrical components (not shown in detail). These electrical components are for example components of the electric motors EM1, EM2 or the inverters 12a, 12b.

Essentially, the steps here are similar to determining the value of a damage input in relation to the at least one mechanical component 5, in particular a bearing or a gear.

Here too, in a first step 101b), values of a temperature of at least one electrical component are determined.

In a second step 102b), a value of a damage input in relation to the at least one electrical component is determined depending on a value of the temperature, and a damage condition resulting from the damage input over a predefined period of time is also determined.

In a third step 103b), a reference damage condition for the temperature for the at least one electrical component is also provided.

In a fourth step 104b), a relative damage condition of the electrical component 7 is determined on the basis of the determined damage condition and the reference damage condition, whereby the second limit value is defined in relation to the relative damage condition.

In a fifth step 105b), it is preferably checked whether the value of the damage condition exceeds the second limit value.

In a sixth step 106b), if the second limit value is exceeded, a threshold value for a power provided by the first electric motor EM1 and/or the second electric motor EM2 is defined, in particular depending on the damage input and/or the damage condition caused by the temperature, whereby the electrically driven axle is controlled taking into account the threshold value for the power provided.

If the thermal damage input is taken into account, the electrically driven axle 1 is additionally controlled taking into account the damage condition of the at least one electrical component in the seventh step 107.

In addition to or as an alternative to the seventh step 107, in this case, in an eighth step 108, the at least one electrical component may be cooled depending on the value of the temperature. With regard to the electrical components, there are thus again two possible ways of relieving the load. One is to reduce the power for the electric motor to which the electrical component is assigned. The second is to cool the electrical component.

Furthermore, if this is possible in terms of power, one of the power transmission paths in which the affected electrical component is located can be disengaged via an upstream transmission, if this is switchable.

Figure 5A:
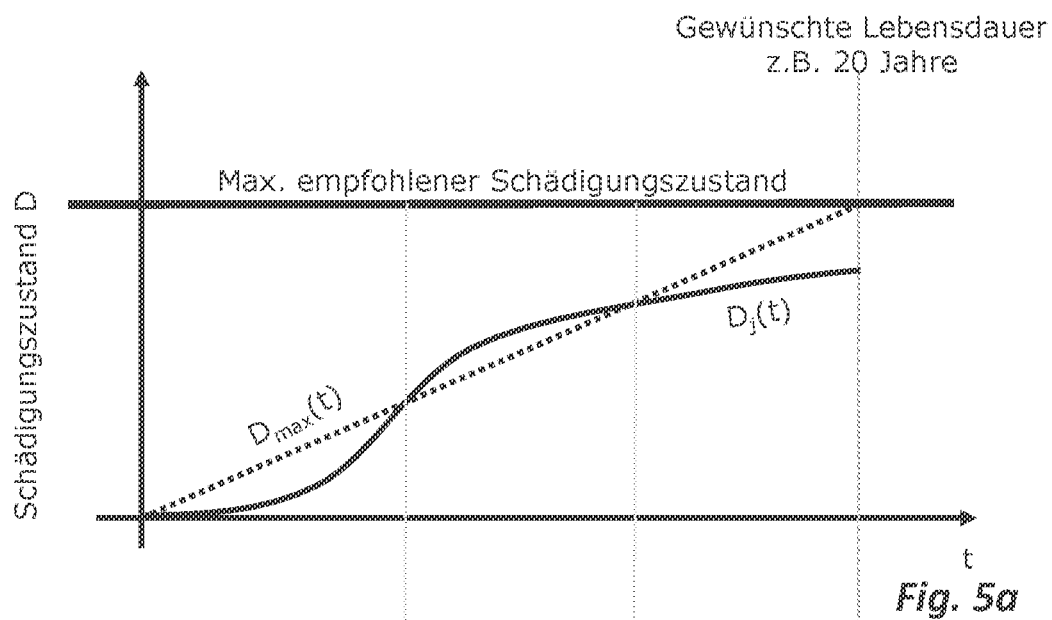
FIG. 5a: shows a diagram showing the progression over time of a damage condition in relation to a progression over time of a maximum proportional damage condition.

FIG. 5a shows a diagram of a damage condition D relative to time. The dashed line Dmax(t) shows the maximum proportional damage condition over time, whereby, at the end of the desired service life of the component, the maximum recommended damage condition, shown as a horizontal line, is reached exactly (dashed line: linear increase). Exceeding the maximum recommended damage condition leads to an increased probability of failure. Dj(t), on the other hand, represents the accumulated damage input, i.e. the damage condition of component 5 in reality at time t, i.e. the damage condition in relation to the component determined from the real loads from torque and speed. This curve Dj(t) increases monotonically. As the diagram shows, from time t1 onwards, this real damage condition Dj(t) exceeds the maximum proportional damage condition Dmax(t) provided for at that time. Taking measures to reduce the damage input after time t1 leads to a flattening of the curve Dj(t). In this way, the curve Dj(t) can be brought back below the curve Dmax(t). At time t2, the curve of the real damage condition falls back below the maximum proportional damage condition Dmax(t2). If no measures were taken in the period between t1 and t2, the curve Di (t) would not flatten and the maximum recommended damage condition would be reached before the end of the desired service life (e.g. 20 years as in the example). There is an increased probability of failure of component 5 before the end of the desired service life.

In FIG. 5a, the desired lifespan is for example twenty years.

Figure 5B:
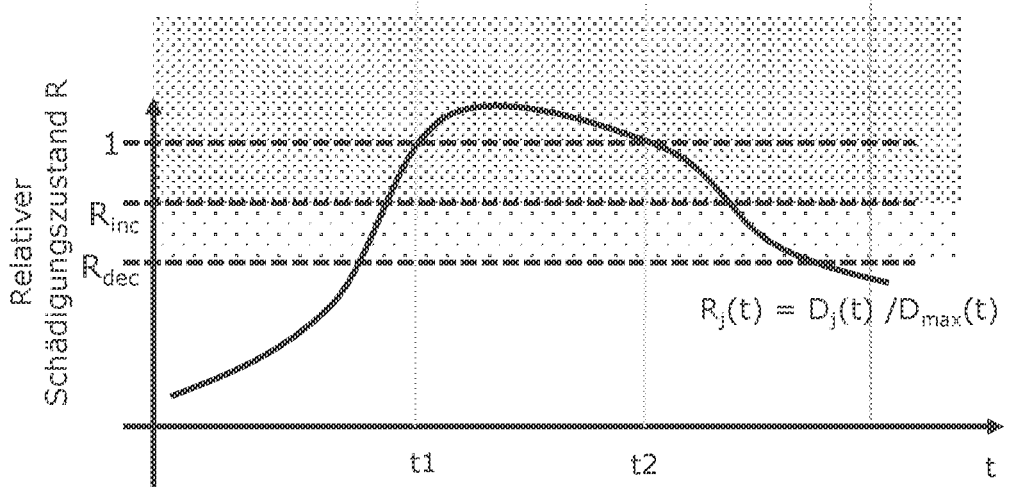
FIG. 5b: shows the progression over time of a relative damage condition.

In FIG. 5b, the relative damage condition $R_j(t)$ is shown in a diagram corresponding to the timeline of FIG. 5a.

The relative damage condition $R_j(t)$ results from dividing the real damage condition $D_j(t)$ by the respective maximum proportional damage condition at a given time t.

The period between $t_1$ and $t_2$ is characterised by the fact that the relative damage condition R rises above 1. This should be prevented in order to prevent premature failure of the component. Accordingly, limit values $R_{inc}$ and $R_{dec}$ are preferably defined, represented in FIG. 5b by dashed lines, from which measures are taken or withdrawn to reduce further damage input. For example, from the limit value $R_{inc}$, which specifies the maximum desired relative damage condition, measures must be taken or increased to reduce the damage input. $R_{dec}$, on the other hand, specifies the value of the relative damage condition below which measures to reduce the damage input can be reduced. Both limit values $R_{inc}$ and $R_{dec}$ are preferably below R=1.

If the value of the relative damage condition $R_j(t)$ rises above 1, a warning light may for example be activated. This indicates that the component has been subjected to above-average loads up to this point.

A damage condition $D_{max}(t)$ therefore represents a time-dependent limit value for the damage condition. The value is different for each component (j)

In FIG. 5b, the value R=1 corresponds to this limit value.

Figure 6:
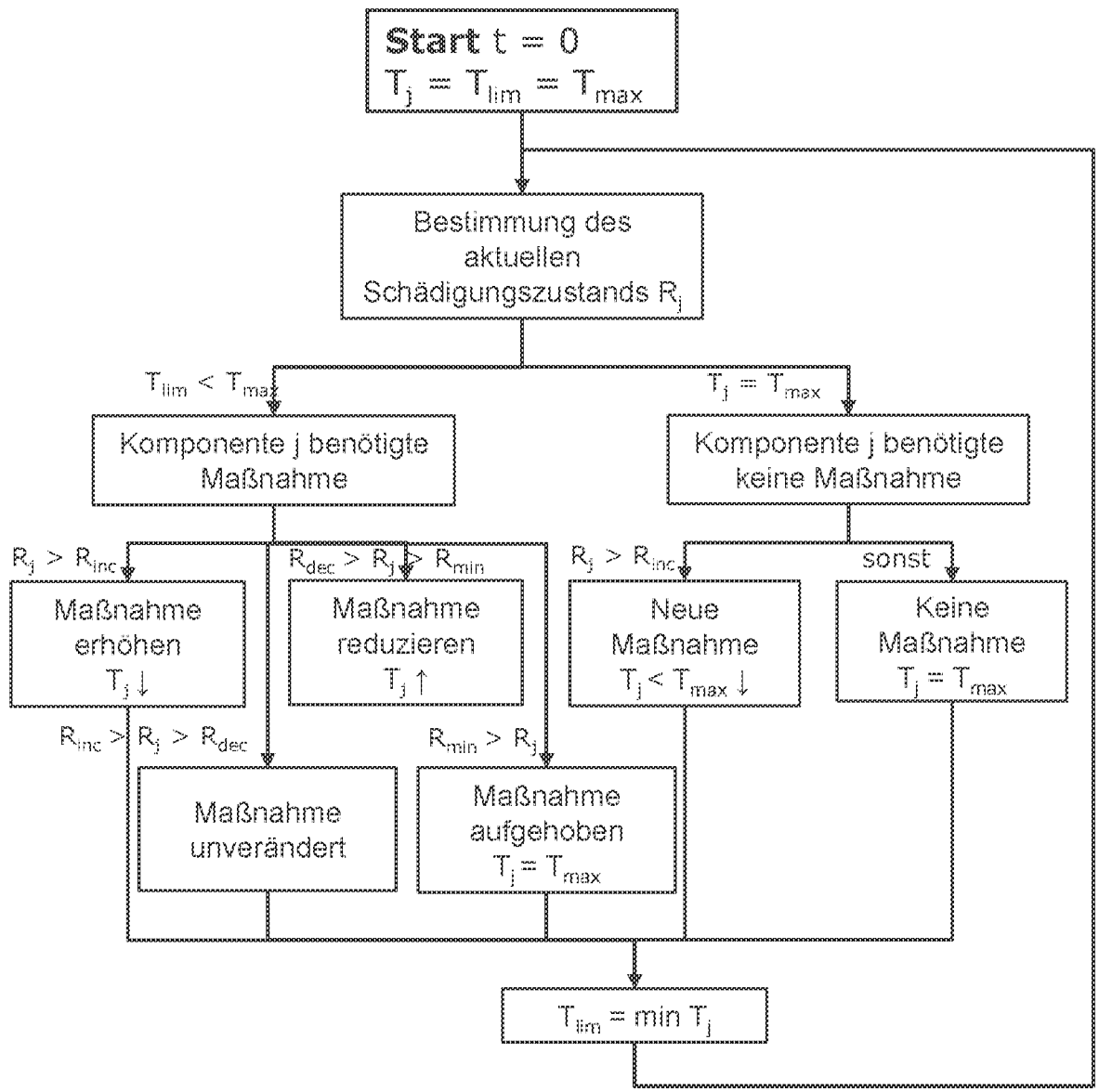
FIG. 6: shows diagrams showing different torque distributions between electric motors of an electrically driven axle.

FIG. 6 represents a process for defining a threshold value for a torque or a power provided by an electric motor depending on limit values for the damage condition.

In each case, j denotes the component under consideration.

FIG. 6 shows a process for defining a threshold value for a torque to be provided by the first electric motor EM1 or by the second electric motor EM2. The measures are intended to counteract overloading of the mechanical components 5 and/or the electrical components of the electrically driven axle. As described above, the measures may involve a threshold value for a torque to be provided by the first electric motor EM1 or by the second electric motor EM2, or a switching process that shifts the operating point of the first electric motor EM1 or the second electric motor EM2 to higher speeds, or completely disengages the electric motor in question, or cooling of the mechanical components 5 and/or electrical components.

The process is explained in relation to a torque limitation. However, it is obvious to the skilled person that this process can also be applied to other measures.

In the following process, Tmax refers to the maximum possible torque at the electric motor EM1 or EM2 of the power transmission path under consideration. If the component j is one of the components of interest in the power transmission path under consideration, then Tj denotes a suggestion for a torque limitation based on the current relative damage condition of this component j. Finally, the torque limitation Tlim is implemented on the electric motor. This is selected based on the limitation suggestions Tj for all components j of interest. So, on the one hand, Tlim is less than or equal to Tj, on the other hand Tlim is also always less than or equal to Tmax. At the start of the process at t=0, there is no torque limitation suggestion Tj in relation to any component j. Therefore, at this point, Tj=Tlim=Tmax applies to all components. This means that there is no active torque limitation based on a torque limitation suggestion for any component j and both electric motors EM1 and EM2 can be operated at their maximum torque Tmax, if necessary.

In a first step in the process, the current relative damage condition Rj is queried in relation to all components j. Since no measure has yet been taken to limit torque at this point, one moves to the right-hand branch of the block diagram. Now it is checked whether the current relative damage condition Rj is greater than the maximum desired relative damage condition Rinc, for which measures need to be introduced or increased. If this is the case, a new measure is defined in relation to the component, in this case a torque limitation suggestion Tj. If, on the other hand, the relative damage condition Rj is less than the limit value Rinc, no action is taken. The torque limitation suggestion in relation to the component Tj is thus still equal to the maximum possible torque Tmax at the respective electric motor EM1, EM2 which drives the respective power transmission path 3, 4.

This check is performed for all components of a power transmission path 3, 4. The active torque limitation $T_{lim}$ for this power transmission path is then set to the minimum determined torque limitation suggestion $T_j$ for a component j. After that, the process starts all over again. Now that there is a measure, i.e. an active torque limitation $T_{lim}$, the process continues on the left-hand branch. Now the current relative damage condition $R_j$ is preferably compared with three different limit values. As already explained, $R_{inc}$ is the maximum desired relative damage condition at which measures must be introduced or increased.

$R_{dec}$ is the relative damage condition under which measures can be reduced.

$R_{min}$ is the relative damage condition under which no measures are required.

The following correlation applies:

$$R_{inc} > R_{dec} > R_{min}$$

If the current relative damage condition $R_j$ is greater than $R_{inc}$, the measure must be increased, in the case of the torque this means that the threshold value for the torque limitation $T_j$ must be lowered.

If the current relative damage condition $R_j$ is less than $R_{min}$, the measures relating to this component can be lifted. In this case, in relation to this component, the maximum torque $T_{max}$ of the respective electric motor EM1, EM2 can be provided.

In the case where the current relative damage condition $R_j$ is less than $R_{dec}$ but greater than $R_{inc}$, the respective measure can be reduced. In the case of a torque limitation, this means that the threshold value can be increased.

If the current relative damage condition Rj is less than Rinc but greater than Rdec, the measure in relation to the component j should be left unchanged.

This sub-process is also repeated for all components j. The active torque limitation $T_{lim}$ is then set for each power transmission path 3, 4 so that it corresponds to the respective threshold value of the strongest measure for a component j in the respective power transmission path 3, 4. In relation to torque, this means that the active torque limitation $T_{lim}$ corresponds to the minimum value of the torque limitation suggestions $T_j$ across all components j.

Figure 7:
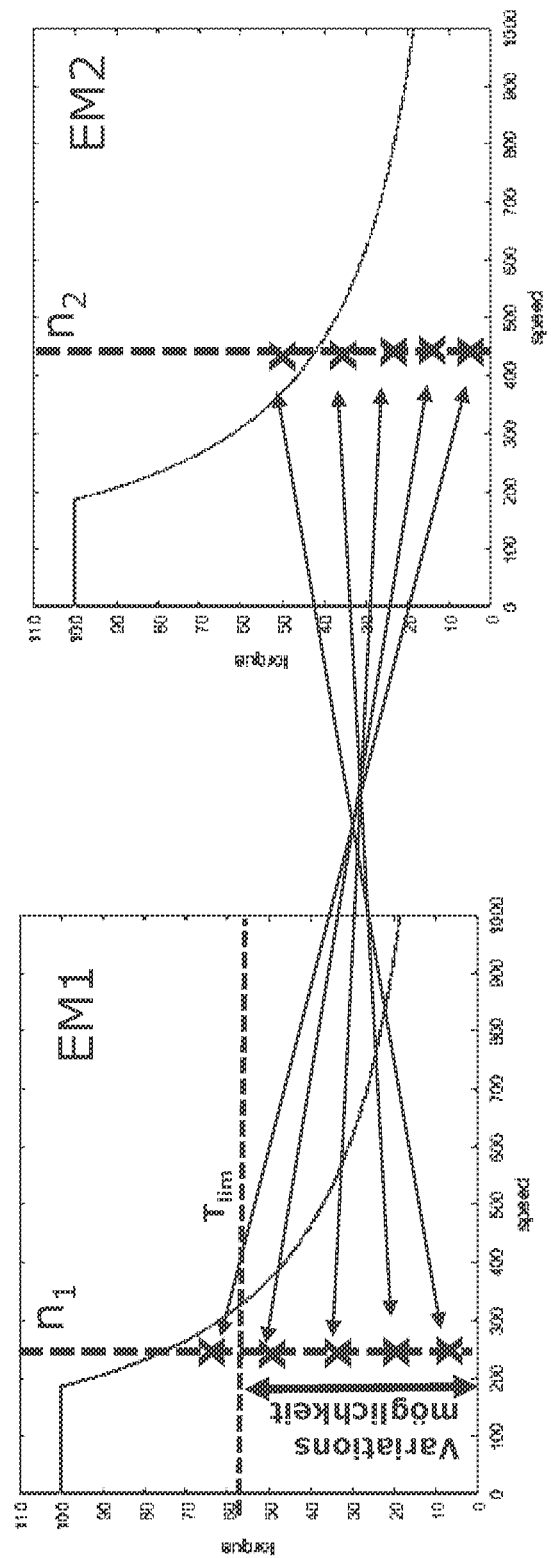
FIG. 7: shows an exemplary embodiment of a process for defining a threshold value for a torque provided by an electric motor.

FIG. 7 shows two diagrams, each showing the motor characteristics of the first electric motor EM1 and the second electric motor EM2. In each case, the torque is plotted above the motor speed.

On the basis of the two diagrams, a torque distribution between the first electric motor EM1 and the second electric motor EM2 can be determined at a given power and given speeds $n_1$, $n_2$ in the two electric motors EM1, EM2. For the first electric motor EM1 or for the first power transmission path 3 which it serves, there is an active torque limitation $T_{lim}$.

Accordingly, only those pairings of torque distributions can be selected at which the torque provided by the first electric motor EM1 is less than $T_{lim}$. Otherwise, the torque distribution is preferably selected in such a way as to achieve optimised operation in terms of the efficiency of the electrically driven axle 1.

Figure 8:
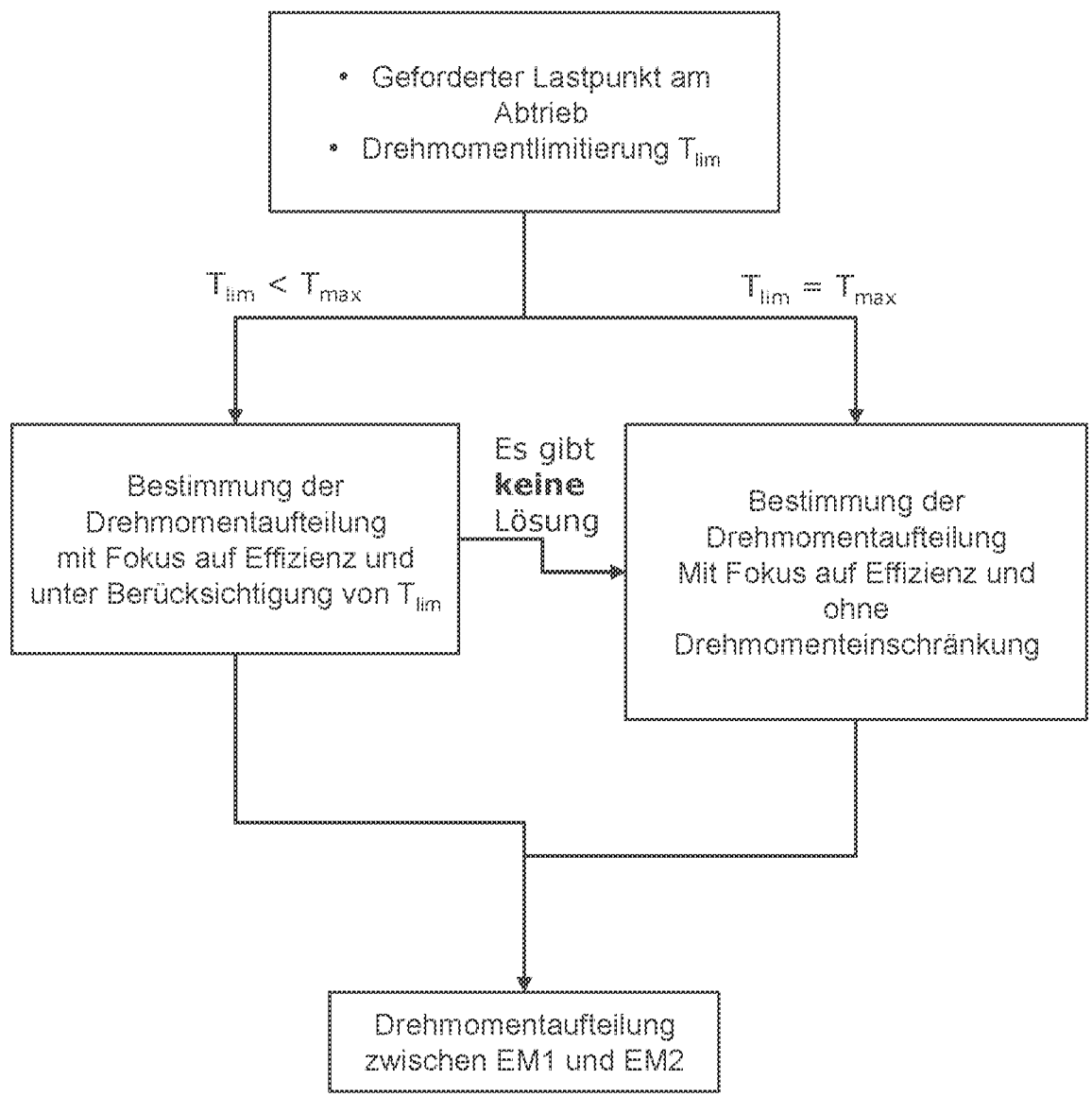
FIG. 8: shows a block diagram of a process for defining a torque distribution between two electric motors of an electrically driven axle.

FIG. 8 represents a process by which such a torque distribution is selected taking into account the overall efficiency of the system.

The specifications for this process are a required load point at the output 2a, 2b, in total, and a possible active torque limitation $T_{lim}$ in one or both of the power transmission paths 3, 4. If there is a torque limitation $T_{lim}$, the torque distribution is determined with a focus on efficiency and taking into account the active torque limitation $T_{lim}$. If there is no solution for this, then in contrast the torque distribution is determined with a focus on efficiency and without taking into account a torque limitation.

The same applies if there was no active torque limitation $T_{lim}$ in the first place.

Figure 9:
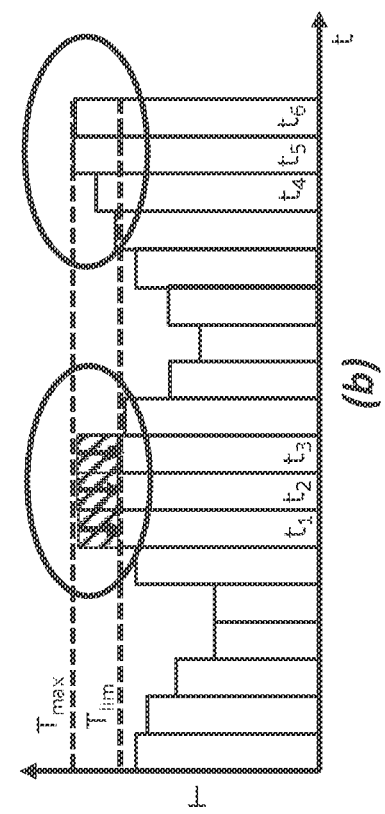
FIG. 9: shows various diagrams relating to an example of a control strategy for an electrically driven axle.
Figure 9:
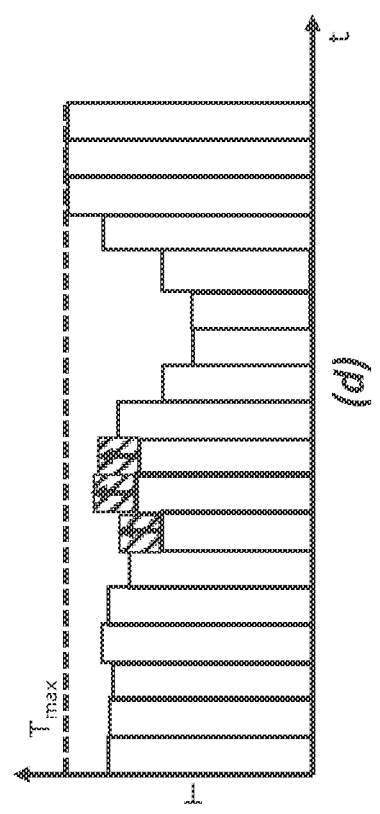
Figure 9:
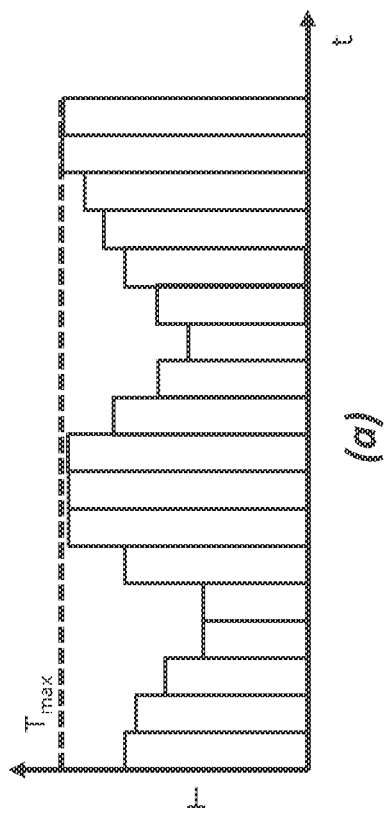
Figure 9:
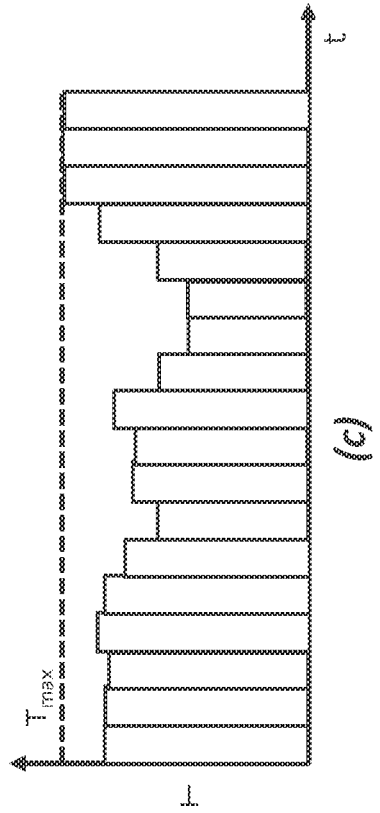

FIG. 9 shows four diagrams (a), (b), (c) (d), which represent a torque over time, a concrete example in which a control strategy according to FIG. 8 is used. FIGS. 9a and 9b each represent discrete-time torques provided by the first electric motor EM1.

FIGS. 9c and 9d, on the other hand, represent those values of the torque provided by the second electric motor EM2. In FIGS. 9a and 9c, there is no active torque limitation $T_{lim}$. In FIGS. 9b and 9d, on the other hand, there is a torque limitation $T_{lim}$ for the first electric motor EM1.

If a torque requested on the first electric motor EM1 exceeds an active torque limitation $T_{lim}$ in relation to this first electric motor EM1 or to the first power transmission path 3, then the excessively requested torque is passed on to the second electric motor EM2, as shown in FIGS. 9b and 9d. This must deliver a greater torque T during the specified times $t_1$, $t_2$, $t_3$ so that the first electric motor EM1 can reduce its provided torque T. This is no longer possible at the later times $t_4$, $t_5$, $t_6$, since the second electric motor EM2 is also already delivering at the power limit or torque limit $T_{max}$. In this case, in order to provide the required torque, a torque redistribution is preferably avoided and the active torque limitation $T_{lim}$ is ignored.

Figure 10:
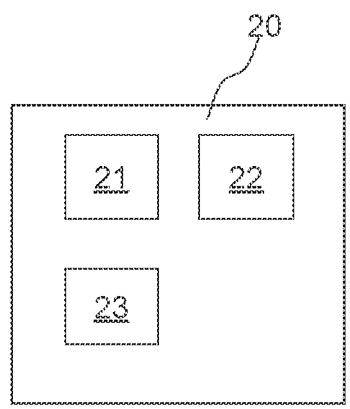
FIG. 10: shows an exemplary embodiment of a system for controlling an electrically driven axle with two electric motors.

FIG. 10 shows a system 20 for controlling an electrically driven axle 1 with two electric motors EM1, EM2.

Such a system 20 preferably has means 21, in particular sensors, for determining values of a speed and a torque applied to at least one mechanical component 5 of the power transmission paths 3, 4 and/or the electric motors EM1, EM2. Furthermore, such a system 20 preferably has means 22 for determining a value of a damage input in relation to the at least one mechanical component 5 depending on the value of the applied speed and the value of the applied torque and determining a value of a damage condition of the at least one mechanical component 5 resulting from damage input over a predefined period of time. Furthermore, such a system 20 preferably has means 23 for controlling the electrically driven axle 1 taking into account the damage condition of the at least one mechanical component 5. Finally, the system has means for controlling, in the case of two electrically driven axles, the electrically driven axles or in the case of one electrically driven axle, the electrically driven axle, taking into account the damage condition of the relative damage condition of different power transmission paths in relation to each other, in particular in such a way that the damage condition of the relative damage condition of different power transmission paths is as balanced as possible.

A means, within the context of the invention, may be implemented in the form of hardware and/or software, and may in particular comprise a processing unit, in particular a digital processing unit, in particular a microprocessor unit (CPU), preferably connected to a memory and/or bus system, and/or one or more programs or program modules. The CPU can be designed to process instructions implemented as a program stored in a storage system, to capture input signals from a data bus, and/or to issue output signals to a data bus. A storage system may contain one or more, in particular different, storage media, in particular optical, magnetic, solid-state and/or other non-volatile media. The program may be designed in such a way that it can embody or carry out the method described here, so that the CPU can execute the steps of such a method.

Preferably, the system 20 has additional means to carry out further-working steps of the method 100. Also preferably, at least some of the means, in particular the whole system 20, is preferably integrated into the E-axle control unit 14.

It should be noted that the exemplary embodiments are only examples and are in no way intended to limit the scope of protection, application and structure. Rather, the preceding description provides the skilled person with a guide for the implementation of at least one exemplary embodiment, whereby various modifications can be made, in particular with regard to the function and arrangement of the described components, without departing from the scope of protection arising from the claims and the equivalent descriptions of features.

The invention claimed is:

1. A method for controlling two electrically driven axles of a vehicle, each with an electric motor, wherein the first electric motor is connected to a first output via at least one first power transmission path and the second electric motor is connected to a second output via at least a second power transmission path, or for controlling an electrically driven axle with two electric motors which jointly drive an output, wherein the first electric motor is connected to the output via at least one first power transmission path and the second electric motor is connected to the output via at least a second power transmission path, comprising the following steps:

determining values for a speed and a torque applied to at least one mechanical component of the power transmission paths and/or the electric motors;

determining a value of a damage input in relation to the at least one mechanical component depending on the value of the applied speed and the value of the applied torque, and determining a value of a damage condition of the at least one mechanical component resulting from damage inputs over a predefined period of time;

in the case of two electrically driven axles, controlling the electrically driven axles or, in the case of one electrically driven axle, controlling the electrically driven axle, taking into account the damage condition or a relative damage condition of the at least one mechanical component, wherein, in the case of two electrically driven axles, the electrically driven axles are controlled in such a way or, in the case of one electrically driven axle, the electrically driven axle is controlled in such a way that:

the damage condition or the relative damage condition of different power transmission paths in relation to each other is taken into account, in particular that the damage condition or the relative damage condition of different power transmission paths is as balanced as possible.

2. The method according to claim 1, wherein, in the case of two electrically driven axles, in order to control the electrically driven axles or, in the case of one electrically driven axle, in order to control the electrically driven axle either a transmission ratio in at least one of the two power transmission paths is adjusted in such a way, or a power distribution between the two electric motors is adjusted in such a way that the at least one mechanical component is not placed under stress.

3. The method according to claim 1, further comprising the following steps:

verifying whether the current value for the damage condition or the relative damage condition of the at least one mechanical component exceeds a first limit value; and when the first limit value is exceeded, defining a threshold value for a torque provided by the first electric motor and/or a torque provided by the second electric motor, in particular depending on the damage input caused by the provided torque, wherein, in the case of two electrically driven axles, the electrically driven axles are controlled taking into account the threshold value for the torque or, in the case of one electrically driven axle, the electrically driven axle is controlled taking into account the threshold value for the torque.

4. The method according to claim 3, wherein, in the case of two electrically driven axles, in order to control the electrically driven axles or, in the case of one electrically driven axle, in order to control the electrically driven axle either a transmission ratio in at least one of the two power transmission paths is adjusted in such a way that the electric motor for which the threshold value is defined can be operated at a different operating point at a different, in particular higher speed, or a power distribution between the two electric motors is adjusted in such a way that the electric motor for which the threshold value is defined has to provide or absorb less torque.

5. The method according to claim 1, wherein the damage condition is determined as follows:

$$\int n \cdot T^p \cdot dt$$

or $$\sum_i n_i T_i^p \Delta t$$

where n is a speed, T is a torque, Δt is a time increment and p is a parameter which indicates an intensity of the damage input for the at least one mechanical component, wherein the parameter p is specified for each mechanical component.

6. The method according to claim 1 further comprising the step:

determining values for a temperature of at least one electrical component;

determining a value for a damage input in relation to at least one electrical component depending on a value of the temperature and a damage condition resulting from the damage input over a predefined period of time, wherein, in the case of two electrically driven axles, the electrically driven axles or, in the case of one electrically driven axle, the electrically driven axle, are additionally controlled taking into account the damage condition of the at least one electric component.

7. The method according to claim 6, further comprising the following steps:

verifying whether the current value for the damage condition or relative damage condition of an electrical component exceeds a second limit value;

when the second limit value is exceeded, defining a threshold value for a power provided by the first electric motor and/or by the second electric motor, in particular depending on the damage input caused by the temperature, wherein, in the case of two electrically driven axles, the electrically driven axles or, in the case of one electrically driven axle, the electrically driven axle, are controlled taking into account the threshold value for the power provided.

8. The method according to claim 7, further comprising the following step:
cooling the at least one electrical component depending on the value of the temperature.

9. The method according to claim 7, further comprising the step:
providing a maximum proportional damage condition for the at least one mechanical component and/or the at least one electrical component; and
determining the relative damage condition based on the determined damage condition and the maximum proportional damage condition, wherein a first limit value and/or the second limit value is defined in relation to the relative damage condition.

10. The method according to claim 8, wherein, when controlling the two electric motors, in the case of two electrically driven axles, an efficiency of the electrically driven axles is also taken into account or, in the case of one electrically driven axle, an efficiency of the electrically driven axle is also taken into account, wherein pairs of operating points of the first and second electric motors are selected in such a way that, while remaining within the threshold value for torque and/or the threshold value for power, an optimised operation in terms of efficiency is achieved in at least one of the two electric motors.

11. The method according to claim 1, wherein the value of the damage input corresponds with an extent to which the at least one mechanical component is damaged by a current operation.

12. The method according to claim 1, wherein the value of the damage condition is the sum of values of the damage input accrued to date.

13. The method according to claim 1, wherein the value of the relative damage condition is a ratio of the current value of the damage condition and a maximum proportional damage condition at a present time, wherein the maximum proportional damage condition corresponds with a proportion of a maximum value that is recommended for the damage condition for a time, for which the at least one mechanical component has been operated from since it was put into operation until the present time.

14. A system for controlling two electrically driven axles of a vehicle, each with an electric motor, wherein the first electric motor is connected to a first output via at least one first power transmission path and the second electric motor is connected to a second output via at least one second power transmission path, or
for controlling an electrically driven axle with two electric motors which jointly drive an output, wherein the first electric motor is connected to the output via at least one first power transmission path and the second electric motor is connected to the output via at least a second power transmission path, comprising:
means for determining values for a speed and a torque applied to at least one mechanical component of the power transmission paths and/or the electric motors;
means for determining a value of a damage input in relation to the at least one mechanical component depending on the value of the applied speed and the value of the applied torque and determining a value of a damage condition of the at least one mechanical component resulting from damage input over a pre-defined period of time;
means for controlling, in the case of two electrically driven axles, the electrically driven axles or, in the case of one electrically driven axle, the electrically driven axle, taking into account the damage condition of the at least one mechanical component; and
means for controlling, in the case of two electrically driven axles, the electrically driven axles or, in the case of one electrically driven axle the electrically driven axle, taking into account the damage condition or a relative damage condition of different power transmission paths in relation to each other, in particular in such a way that the damage condition or the relative damage condition of different power transmission paths is as balanced as possible.

15. Vehicle with the system according to claim 14.

* * * * *